United States Patent [19]
Tsuchiya et al.

[11] Patent Number: 4,729,844
[45] Date of Patent: Mar. 8, 1988

[54] SOLID ELECTROLYTIC CAPACITOR

[75] Inventors: Sohji Tsuchiya, Kanagawa; Yasuo Kudoh, Yokohama; Toshikuni Kojima, Kawasaki; Susumu Yoshimura, Yokohama, all of Japan

[73] Assignee: Matsushita Electric Industrial Co., Ltd., Kodama, Japan

[21] Appl. No.: 919,999

[22] Filed: Oct. 17, 1986

[30] Foreign Application Priority Data

Oct. 18, 1985 [JP] Japan .................................. 60-233642

[51] Int. Cl.$^4$ ................................................ H01G 1/00
[52] U.S. Cl. ...................................... 252/62.2; 361/433
[58] Field of Search ..................... 361/433 S; 252/62.2

[56] References Cited

U.S. PATENT DOCUMENTS

| | | | |
|---|---|---|---|
| 4,580,855 | 4/1986 | Niwa .................................. | 361/433 S |
| 4,590,541 | 5/1986 | Takahashi et al. ................. | 252/62.2 |
| 4,601,853 | 7/1986 | Hilti et al. ......................... | 361/433 S |
| 4,609,971 | 9/1986 | Shaffer ............................... | 361/433 S |

Primary Examiner—Arthur P. Demers
Attorney, Agent, or Firm—Cushman, Darby & Cushman

[57] ABSTRACT

A solid electrolyte of an electrolytic capacitor is constituted of an ion radical complex salt of N-isoamylisoquinolinium(TCNQ)$_2$, or the N-isoamylisoquinolinium(TCNQ)$_2$ and neutral TCNQ, and the solid electrolyte has high heat fusability, high heat stability and splendid infiltration ability into an anode oxide film, and is disposed between the anode oxide film and a cathode, and therefore, a capacitance, dielectric loss and life of the capacitor are improved.

5 Claims, No Drawings

SOLID ELECTROLYTIC CAPACITOR

FIELD OF THE INVENTION AND RELATED ART STATEMENT

1. Field of the Invention

The present invention relates to a solid electrolytic capacitor, and more particularly to solid electrolytic capacitor using an improved organic semiconductor as a solid electrolyte.

2. Description of the Related Art

Recently, with development of digital circuit of various electric appliances, demand for small size capacitors for the digital circuit, which have low impedances at high frequency and large capacities, has become large.

Heretofore, plastic film capacitors, mica capacitors, laminated ceramic capacitors or the like have been used as the capacitors for high frequency use. However, in the film capacitors and the mica capacitors, it is difficult to realize large capacity and minimizing its size at the same time. Furthermore, when minimizing of size and increasing of capacitance are intended in the laminated ceramic capacitor, temperature characteristic thereof becomes poor, and further they will induce large cost.

On the other hand, as the capacitor having large capacity, an aluminum dry electrolytic capacitor, an aluminum or tantalum solid electrolytic capacitor and the like are well known.

In such capacitors, it is possible to give a large capacitance, since in such capacitors, an anode oxide film as dielectric can be made very much thin. But, on the other hand the oxide film is liable to be easily damaged, and therefore, it is necessary to provide such capacitor with electrolyte between the anode oxide film and a cathode, thereby to restore the damaged oxide film. In an aluminum dry electrolytic capacitor, etched aluminum films as anode and cathode are wound with putting a paper separator therebetween, into which the electrolyte is infiltrated. Such type of capacitors have a liability of decrease of capacitance and increase of dielectric loss (tan δ) due to leakage and evaporate of the electrolyte, and furthermore, there is a liability of deteriorations of high frequency characteristic and low temperature characteristic due to reduction of ion conductivity of the electrolyte.

Moreover, in the aluminum or tantalum solid electrolytic capacitor, manganese dioxide has been used as solid electrolyte to solve the above-mentioned problem of the aluminum dry electrolytic capacitor. This electrolyte is obtained by imersing an anode element into manganese nitrate aqueous solution and subjecting it to a thermal decomposition at about 350° C. In case of this capacitor, there is no leakage of the electrolyte and decline of characteristic of capacitor based on congelation thereof at low temperature, since the electrolyte is not liquid but solid matter. Therefore, it shows more splendid frequency characteristic and temperature characteristic than that of the capacitor employing liquid electrolyte. However, there is a problem in that the impedance in high frequency and dielectric loss are higher by one digit than that of the laminated ceramic capacitor and the plastic film capacitor, because of the damage of the oxide film based on thermal decomposition of the manganese nitrate and low electric conductivity of the manganese dioxide.

In order to solve the above-mentioned problem, it has been proposed to use an organic semiconductor such as 7,7,8,8-tetracyanoquinodimethane complex (hereinafter referred to as TCNQ) as the solid electrolyte. This TCNQ is splendid in the electric conductivity and anode oxidation ability. The organic semiconductor can be applied on and infiltrated into the anode oxide film by means of dissolving it in organic solvent and making it molten state by heating it, and thereby, the damage of the oxide film due to thermal decomposition at infiltration of the $MnO_2$ thereinto can be avoided. As a result, the solid electrolytic capacitor having large capacitance can be realized, since the TCNQ complex has high electric conductivity and is splendid in the anode oxidation ability and high frequency characteristic. For instance, U.S. Pat. No. 4,580,855 discloses an invention wherein the organic semiconductor made of N-n-propylisoquinolinium and the TCNQ are used as solid electrolyte. According to the above-mentioned invention of U.S. Patent, the infiltration of the TCNQ salt into the oxide film of dielectric of winding type aluminum electrolytic capacitor is made by heating the TCNQ salt to melt it. And as a result, strong adhesion between the TCNQ salt and the oxide film is attained, and furthermore, the TCNQ salt has high electric conductivity, thereby providing an aluminum electrolytic capacitor which is much improved in the frequency characteristic and the temperature characteristic. As mentioned above, use of the organic semiconductor comprising the TCNQ salt as the solid electrolyte enables to provide capacitors which are more splendid in the frequency characteristic and the temperature characteristic than that of solid electrolytic capacitor using the $MnO_2$ as solid electrolyte, since the TCNQ salt is more splendid in the electric conductivity and anode oxidation ability, namely, damaged anode oxide film is rapidly restored.

Additionally, in the above-mentioned U.S. Pat. No. 4,580,855, the oxide film is infiltrated with the N-alkylisoquinolinium TCNQ salt.

However, heat stability and the heat fusability of aforementioned N-alkylisoquinolinium TCNQ salt have varieties for different kind of the substituted alkyl group, and therefore usable alkyl group is limited. When carbon number of the alkyl is less than two, the N-alkyl-isoquinolinium TCNQ salt is not melted by heat.

Therefore, in the U.S. Pat. No. 4,580,855, propyl, isopropyl and butyl group are used as the alkyl group in the embodiment. However even the TCNQ salts involving the above-mentioned alkyl group cause oxidation decomposition, when they are left in heated molten state in the course of time. Moreover it is required to make the TCNQ salt amorphous state by rapid cooling treatment after the infiltration of the molten TCNQ salt into the oxide film, since the TCNQ salt does not only easily crystallizes, but also when the TCNQ salts cause oxidation decomposition, or firmly crystallize, particularly, the electric conductivity thereof lowers, and the dielectric loss becomes large. And furthermore, each capacitance of the TCNQ salts differs depending on carbon number of the alkyl group. When the butyl group is used, attainment ratio of the capacitance is about 80%.

Moreover, when the stability of the TCNQ salt in heated molten state is insufficient, composition of the TCNQ salt easily changes, and it causes dispersion of the capacitor characteristic. Therefore, the infiltration of the molten TCNQ salt into capacitor unit (oxide film)

should be made in a short time. And the operation of the infiltration is very much difficult.

OBJECT AND SUMMARY OF THE INVENTION

The present invention is intended to solve such problems of the prior art, and has as its object an improvement of heat fusability, heat stability and infiltration ability into an oxide film, thereby to provide electrolytic capacitors at a low cost.

The present invention has as another object of extension and stabilization of life of the electrolytic capacitor, and as further object improvement of capacitance and elimination of dispersion of capacitor characteristic.

Solid electrolytic capacitor of the present invention comprises
- a first electrode made of valve metal having an anode film on its surface,
- a second electrode provided opposing to the first electrode,
- a solid electrolyte comprising an ion radical complex salt formed essentially of N-isoamylisoquinolinium as cation and 7.7.8.8-tetracyanoquinodimethane (TCNQ) as anion, the solid electrolyte being disposed between the first electrode and the second electrode.

And furthermore, the solid electrolyte further comprises neutral 7.7.8.8-tetracyanoquinodimethane (TCNQ) besides the above-mentioned constituents.

In the solid electrolytic capacitors of the present invention, as mentioned above, the ion radical complex salt (TCNQ salt) or that which further comprises the neutral TCNQ are used as the solid electrolyte. They are splendid in heat fusability, heat stability and infiltration ability into an oxide film. Therefore capacitance and life of the solid electrolytic capacitor are much improved and furthermore dispersion of the capacitor characteristic is much decreased.

DESCRIPTION OF THE PREFERRED EMBODIMENT

EMBODIMENT 1

In the following, a solid electrolytic capacitor embodying the present invention is elucidated in comparison with a conventional solid electrolytic capacitor wherein N-n-butylisoquinolinium(TCNQ)$_2$ is used as a solid electrolyte.

Melting point of the N-n-butylisoquinolinium(TCNQ)$_2$ is in a range of 215° C.~220° C. according to DTA (differential thermal analysis) or DSC (differential scanning calorimeter). When temperature of it reaches above the melting point, though influenced by surrounding condition to some extent, generally, it easily suffers oxidation decomposition. In order to melt the N-n-butylisoquinolinium(TCNQ)$_2$, it is put into an aluminum block open case which is kept at 250° C. constant, and it takes about 30 seconds before the N-n-butylisoquinolinium(TCNQ)$_2$ melts. The molten N-n-butylisoquinolinium(TCNQ)$_2$ is stable for only about 45-60 seconds in molten state after it has molted, and thereafter, decomposition of it starts.

On the other hand, the melting point of the N-isoamylisoquinolinium(TCNQ)$_2$ used as the solid electrolyte in the embodiment of the present invention is about 225° C.-230° C. according to the DTA. Under the same condition as that of the above-mentioned N-n-butylisoquinolinium-(TCNQ)$_2$, it take about 30-35 seconds before N-isoamylisoquinolinium(TCNQ)$_2$ melts, and it is stable for about 90-120 seconds in molten state.

In this way, by changing N-alkyl group of the TCNQ salt from N-butyl group to isoamyl group, surface of the oxide film is effectively etched, thereby making it porous, and therefore, the infiltration ability into the oxide film and adhesion ability thereto of the solid electrolyte are improved.

The solid electrolytic capacitor of this embodiment is essentially constituted of a first electrode made of the valve metal such as aluminum, tantalum or titanium or alloy thereof, which has an anode oxide film formed by anode oxidation (or chemical reaction) on its surface, and a second electrode provided opposing to the first electrode, and the above mentioned N-isoamylisoquinolinium(TCNQ)$_2$ as the solid electrolyte which is disposed between the first electrode and the second electrode.

Characteristics of this solid electrolytic capacitor is described in comparison with that of the comparison example of the conventional solid electrolytic capacitor using the N-n-butylisoquinolinium(TCNQ)$_2$ as the solid electrolyte.

The solid electrolyte was crashed into fine powder, and thereafter, it was put into an aluminum case (6.5 mm in diameter, 6 mm in height) in necessary amount, and it is put on the hot plate of 250° C. for 60 seconds to melt the solid electrolyte into liquid state.

And then, a wound unit (3 μF of rating, for 50 V) of aluminum electrolytic capacitor of winding type was sunk into the molten electrolyte to make satisfactory infiltration of the electrolyte into the oxide film, and thereafter, it was rapidly cooled by using liquid N$_2$ as refrigerant.

In the present embodiment, the aluminum film, on each edge whereof the oxide film was previously formed by known anode oxidation, was used for the wound unit.

Finally an opening of the aluminum case was sealed with epoxy resin thereby obtaining the solid electrolytic capacitor.

The characteristics of this capacitor in frequencies of 120 Hz and 1 KHz and change of capacitance after 1000 Hr in a frequency of 120 Hz and a temperature of 85° C. are shown in the following Table 1 with those of the conventional one (comparison example) using N-n-butylisoquinolinium(TCNQ)$_2$ as solid electrolyte. Additionally, every data of Table 1 are of mean values from ten samples.

TABLE 1

| | characteristic | | | | |
|---|---|---|---|---|---|
| | 120 Hz | | 1 KHz | | |
| electrolyte | Capacitance (μF) | dielectric loss Tanδ (%) | Capacitance (μF) | dielectric loss Tanδ (%) | ΔC 120 Hz |
| N—n-butylisoquinolinium(TCNQ)$_2$ (comparative sample) | 2.70 | 0.5 | 2.59 | 2.3 | −5% |
| N—isoamylisoquinolinium(TCNQ)$_2$ (present embodiment) | 2.85 | 0.1 | 2.81 | 1.5 | −2% |

As clearly shown in Table 1, the solid electrolytic capacitor embodying the present invention showed more splendid characteristics of capacitor in both frequencies of 120 Hz and 1 KHz than those of comparative conventional one, and furthermore, the change of the capacitance after 1000 Hr in a frequency of 120 Hz and a temperature of 85° C. was smaller than that of the conventional one.

EMBODIMENT 2

Hereunder, another embodiment wherein the solid electrolytic capacitor further comprises neutral TCNQ is explained. In this embodiment, the solid electrolyte was essentially constituted of the N-isoamylisoquinolinium-(TCNQ)$_2$ and the neutral TCNQ. That is, it was made by adding the neutral TCNQ to the N-isoamylisoquinolinium-(TCNQ)$_2$. In the same condition as that of the embodiment 1, it took above 60 seconds before the solid electrolyte melted, and it was stable in molten state for above 150 seconds after it had molten.

And then, adjusting the temperature of the aluminum block case at 270° C., the melting test was similarly performed. In this case, oxidation decomposition of the N-n-butylisoquinolinium(TCNQ)$_2$ and subsequently evaporation were apt to take place after it had molten, and therefore, composition of TCNQ salt was apt to change. The isoamylisoquinolinium(TCNQ)$_2$ was stable in molten state for 60~90 seconds.

On the other hand, the solid electrolyte wherein the neutral TCNQ was added to the N-isoamylisoquinolinium-(TCNQ)$_2$ was stable in molten state for above 120 seconds. And furthermore, though N-isoamylisoquinolinium(TCNQ)$_2$ showed lowest electric conductivity at a room temperature among the above-mentioned three solid electrolyte, the change of the electric conductivity was large around a temperature of melting point thereof and in the solid state of a temperature range of $-50°$ C.$-150°$ C. Such a change of the electric conductivity was reduced by adding the neutral TCNQ thereto. When above 5 weight parts of the neutral TCNQ was added to 100 weight parts of the N-isoamylisoquinolinium(TCNQ)$_2$, the above-mentioned effect of addition thereof was remarkable. On the other hand, when above 20 weight parts of the neutral TCNQ was added to 100 weight parts of N-isoamylisoquinolinium(TCNQ)$_2$, the electric conductivity became small, and therefore, the characteristic of the capacitor deteriorated, since the dielectric loss (tan δ) increased.

The solid electric capacitor of the present embodiment was essentially constituted of a first electrode made of valve metal such as aluminum, tantalum or titanium or alloys thereof, which had an anode oxide film formed on its surface by anode oxidation, a second electrode opposing to the first electrode, and the solid electrolyte wherein 10 weight parts of the neutral TCNQ was added to 100 weight parts of the N-isoamylisoquinolinium(TCNQ)$_2$, and the solid electrolyte was disposed between the first electrode and the second electrode.

The solid electrolyte was crashed into fine powder, and the, necessary amount of it was put into an aluminum case (10 mm in diameter 11 mm in height) and it was put on the hot plate of 270° C. for 60 seconds to melt the solid electrolyte into liquid state.

Thereafter, a wound unit (100 μF of rating, for 16 V) of the winding type of aluminum electrolytic capacitor was sunk into the molten electrolyte to make satisfactory infiltration of the electrolyte, and thereafter, it was rapidly cooled by using the liquid N$_2$ as refrigerant.

In the present embodiment, the aluminium film, on its every edge of which the oxide film was formed previously was used for the wound unit.

Finally, an opening of the aluminum case was sealed with epoxy resin, thereby obtaining the solid electrolytic capacitor.

Next, the characteristics of the capacitor in frequencies of 120 Hz and 1 KHz, and the change of capacitance thereof after it is left for 1000 Hr at a temperature of 105° C. and a frequency of 120 Hz are shown in Table 2 below. In this capacitor, the solid electrolyte wherein 10 weight parts of the neutral TCNQ is added to 100 weight parts of N-isoamylisoquinolinium(TCNQ)$_2$ was used. Every data of Table 2 are of mean values from ten samples.

TABLE 2

| | characteristic | | | | |
|---|---|---|---|---|---|
| | 120 Hz | | 1 KHz | | |
| electrolyte | Capacitance (μF) | dielectric loss Tanδ (%) | Capacitance (μF) | dielectric loss Tanδ (%) | ΔC 120 Hz |
| N—n-butylisoquinolinium(TCNQ)$_2$ (comparative sample) | 91.0 | 3.2 | 83.2 | 12.0 | −11% |
| N—isoamylisoquinolinium(TCNQ)$_2$ (sample of embodiment 1) | 95.0 | 2.7 | 88.0 | 10.5 | −7% |
| N—isoamylisoquinolinium(TCNQ)$_2$ 100 weight parts + non-radical TCNQ 10 weight parts (present embodiment) | 97.5 | 2.7 | 91.0 | 8.8 | −2% |

As shown clearly in Table 2, the solid electrolytic capacitor of the present embodiment showed more splendid capacitor characteristic in both frequencies of 120 Hz and 1 KHz than that of comparative conventional one and furthermore than that of the capacitor of the embodiment 1. Moreover, the change of the capacitance after 1000 Hr in a frequency of 120 Hz and a temperature of 105° C. was smaller than that of the other two capacitor.

Dispersions of the capacitance of the capacitor wherein the neutral TCNQ was not contained in its electrolyte was in a range of ±5 μF, and the dielectric loss (tan δ) thereof was in a range of 2.5–6%. On the other hand, in the capacitor of the present embodiment, dispersion of the capacitance was in a range of ±3 μF, and the dielectric loss (tan δ) thereof was in a range of 2.4–4%.

Moreover, when 5–20 weight parts of the neutral TCNQ is added to 100 weight parts of the N-isoamylisoquinolinium(TCNQ)$_2$, an effect of addition of the neutral TCNQ was almost the same as the above.

As mentioned above, by using the electrolyte wherein 5–20 weight parts of the neutral TCNQ is added to the N-isoamylisoquinolinium(TCNQ)$_2$ as the solid electrolyte, improvement of the capacitor characteristic and high reliance to the life of the solid electrolytic capacitor was realized.

What is claimed is:

1. Solid electrolytic capacitor comprising
   a first electrode made of valve metal having an anode film on its surface, a second electrode provided opposing to said first electrode, and a solid electrolyte comprising an ion radical complex salt formed essentially of N-isoamylisoquinolinium as cation and 7.7.8.8-tetracyanoquinodimethane as anion, said solid electrolyte being disposed between said first electrode and said second electrode.

2. Solid electrolytic capacitor in accordance with claim 1 wherein;

said anode film is formed by an anode oxidation or a chemical forming.

3. Solid electrolytic capacitor comprising a first electrode made of valve metal having a anode film on its surface, a second electrode provided opposing to said first electrode, and a solid electrolyte comprising a ion radical complex salt formed essentially of N-isoamylisoquinolinium as cation, 7.7.8.8-tetracyanoquinodimethane as anion and neutral 7.7.8.8-tetracyanoquinodimethane, said solid electrolyte being disposed between said first electrode and said second electrode.

4. Solid electrolytic capacitor in accordance with claim 3 wherein;

sand anode film is formed by an anode oxidation or an chemical forming.

5. Solid electrolytic capacitor in accordance with claim 3 wherein;

addition amount of said 7.7.8.8-tetracyanoquinodimethane is in a range of 5–20 weights parts to 100 weight parts of said ion radical complex salt.

* * * * *